(12) United States Patent
Goodrich

(10) Patent No.: US 10,118,845 B2
(45) Date of Patent: Nov. 6, 2018

(54) WASTEWATER TREATMENT SYSTEMS AND RELATED METHODS

(71) Applicant: Edward Goodrich, Nags Head, NC (US)

(72) Inventor: Edward Goodrich, Nags Head, NC (US)

( * ) Notice: Subject to any disclaimer, the term of this patent is extended or adjusted under 35 U.S.C. 154(b) by 21 days.

(21) Appl. No.: 15/492,303

(22) Filed: Apr. 20, 2017

(65) Prior Publication Data

US 2017/0217807 A1    Aug. 3, 2017

Related U.S. Application Data

(62) Division of application No. 14/620,810, filed on Feb. 12, 2015, now Pat. No. 9,663,935.

(51) Int. Cl.
| | |
|---|---|
| E03F 3/00 | (2006.01) |
| E03F 11/00 | (2006.01) |
| C02F 3/00 | (2006.01) |
| E03F 5/00 | (2006.01) |
| C02F 3/28 | (2006.01) |
| E03F 1/00 | (2006.01) |
| E03B 1/04 | (2006.01) |
| E03F 3/02 | (2006.01) |

(52) U.S. Cl.
CPC ............ *C02F 3/2866* (2013.01); *C02F 3/00* (2013.01); *E03B 1/041* (2013.01); *E03F 1/002* (2013.01); *E03F 1/003* (2013.01); *E03F 3/00* (2013.01); *E03F 3/02* (2013.01); *E03F 5/00* (2013.01); *E03F 11/00* (2013.01); *C02F 2203/006* (2013.01); *C02F 2307/00* (2013.01); *Y10S 210/92* (2013.01); *Y10T 29/49716* (2015.01)

(58) Field of Classification Search
CPC ... E03F 1/002; E03F 1/003; E03F 3/00; E03F 3/02; E03F 5/00; E03F 11/00; C02F 3/00; C02F 2103/005; C02F 2203/006; C02F 2303/14; C02F 2307/00; Y10S 210/919; Y10S 210/92; Y10T 29/49716
USPC ........ 210/601, 747.1, 170.01, 170.08, 195.1, 210/919, 920; 29/401.1; 52/741.1, 52/741.12
See application file for complete search history.

(56) References Cited

U.S. PATENT DOCUMENTS

| | | |
|---|---|---|
| 3,875,051 A | 4/1975 | Kovarik |
| 4,228,006 A | 10/1980 | Hanna |
| 5,114,586 A | 5/1992 | Humphrey |
| 5,192,426 A | 3/1993 | DeCoster et al. |
| 5,288,412 A | 2/1994 | Voorhees et al. |
| 5,534,147 A | 7/1996 | Kallenbach et al. |
| 5,895,569 A | 4/1999 | Connelly |
| 5,954,451 A | 9/1999 | Presby |
| 6,887,375 B2 | 5/2005 | Johnson |

(Continued)

FOREIGN PATENT DOCUMENTS

| | | |
|---|---|---|
| CN | 1509988 A | 7/2004 |
| CN | 101928097 B | 5/2012 |

(Continued)

*Primary Examiner* — Christopher Upton
(74) *Attorney, Agent, or Firm* — Myers Bigel, P.A.

(57) ABSTRACT

The invention relates to wastewater treatment systems with decentralized disposal of treated wastewater and methods of using the same. The invention further relates to methods of converting existing septic systems to a wastewater treatment plant system.

12 Claims, 2 Drawing Sheets

(56) References Cited

U.S. PATENT DOCUMENTS

| | | | |
|---|---|---|---|
| 8,840,789 B2* | 9/2014 | Creffield | C02F 9/00 |
| | | | 210/920 |
| 9,663,935 B2* | 5/2017 | Goodrich | C02F 3/00 |
| 2002/0166812 A1 | 11/2002 | Rylander et al. | |
| 2003/0066804 A1* | 4/2003 | Tipton | E03F 3/02 |
| | | | 210/170.08 |
| 2004/0025938 A1* | 2/2004 | Berry, Jr. | E03F 3/02 |
| | | | 137/236.1 |
| 2010/0224577 A1 | 9/2010 | Ball | |
| 2011/0284088 A1* | 11/2011 | Mahony | C02F 1/00 |
| | | | 210/601 |
| 2012/0024766 A1 | 2/2012 | McKinney | |
| 2012/0228117 A1 | 9/2012 | Panunzio | |
| 2013/0078038 A1 | 3/2013 | Potts | |

FOREIGN PATENT DOCUMENTS

| | | |
|---|---|---|
| CN | 202705187 U | 1/2013 |
| WO | WO 2014/055838 A1 | 4/2014 |

* cited by examiner

WASTEWATER TREATMENT SYSTEMS AND RELATED METHODS

STATEMENT OF PRIORITY

This application is a divisional of and claims priority to U.S. patent application Ser. No. 14/620,810, filed Feb. 12, 2015, the entire contents of which are incorporated by reference herein.

FIELD OF THE INVENTION

The invention relates to wastewater treatment, systems with decentralized disposal of treated wastewater and methods of using the same. The invention further relates to methods of converting existing septic systems to a wastewater treatment plant system.

BACKGROUND OF THE INVENTION

The treatment of wastewater and sewage often involves the use of septic systems, particularly in rural areas and barrier islands where municipal wastewater treatment plants are not available. However, septic systems have several negative features, including the need for regular, maintenance pumping and treatment, the risk of septic backup into residences, the potential for environmental contamination, and the concern about rising water table levels near the coast due to rising sea levels.

Wastewater treatment plants avoid the risks associated with septic systems but have negative features of their own, particularly the need for large land areas for disposal of treated wastewater.

The present invention overcomes shortcomings in the art by providing wastewater treatment systems with decentralized disposal of treated wastewater as well as methods of converting existing septic systems to a wastewater treatment plant system.

SUMMARY OF THE INVENTION

The present invention relates to a system and method for wastewater treatment and decentralized disposal of the treated wastewater. The present invention farther provides a system and method for converting existing septic wastewater systems to a wastewater treatment plant system.

In one aspect, the present, invention relates to a wastewater treatment system comprising:
a wastewater source;
an outlet line fluidly connecting the wastewater source to a wastewater treatment plant;
an inlet line fluidly connecting the wastewater treatment plant to a holding tank for treated wastewater, wherein the holding tank is located at or adjacent to the wastewater source; and
a distribution line fluidly connecting the holding tank to a treated wastewater use recipient.

In another aspect, the present invention relates to a method for treating wastewater, the method comprising:
transporting wastewater from a wastewater source through an outlet line to a wastewater treatment plant;
treating the wastewater at the wastewater treatment plant to produce treated wastewater;
transporting the treated wastewater through an inlet line to a holding tank for treated wastewater, wherein the holding tank is located at or adjacent to the wastewater source; and
distributing the treated wastewater through a distribution line to a treated wastewater use recipient.

In a further aspect, the present invention relates to a method for converting an existing septic wastewater system to a wastewater treatment plant system, the method comprising:
converting a septic tank to a treated wastewater holding tank;
fluidly connecting an outlet line from a wastewater source to a wastewater treatment plant;
fluidly connecting an inlet line from the wastewater treatment plant to the treated wastewater holding tank, wherein the holding tank is located at or adjacent to the wastewater source; and
fluidly connecting a distribution line from the holding tank to a treated wastewater use recipient.

These and other aspects of the invention are set forth in more detail in the description of the invention below.

DETAILED DESCRIPTION OF THE INVENTION

Figure 1:
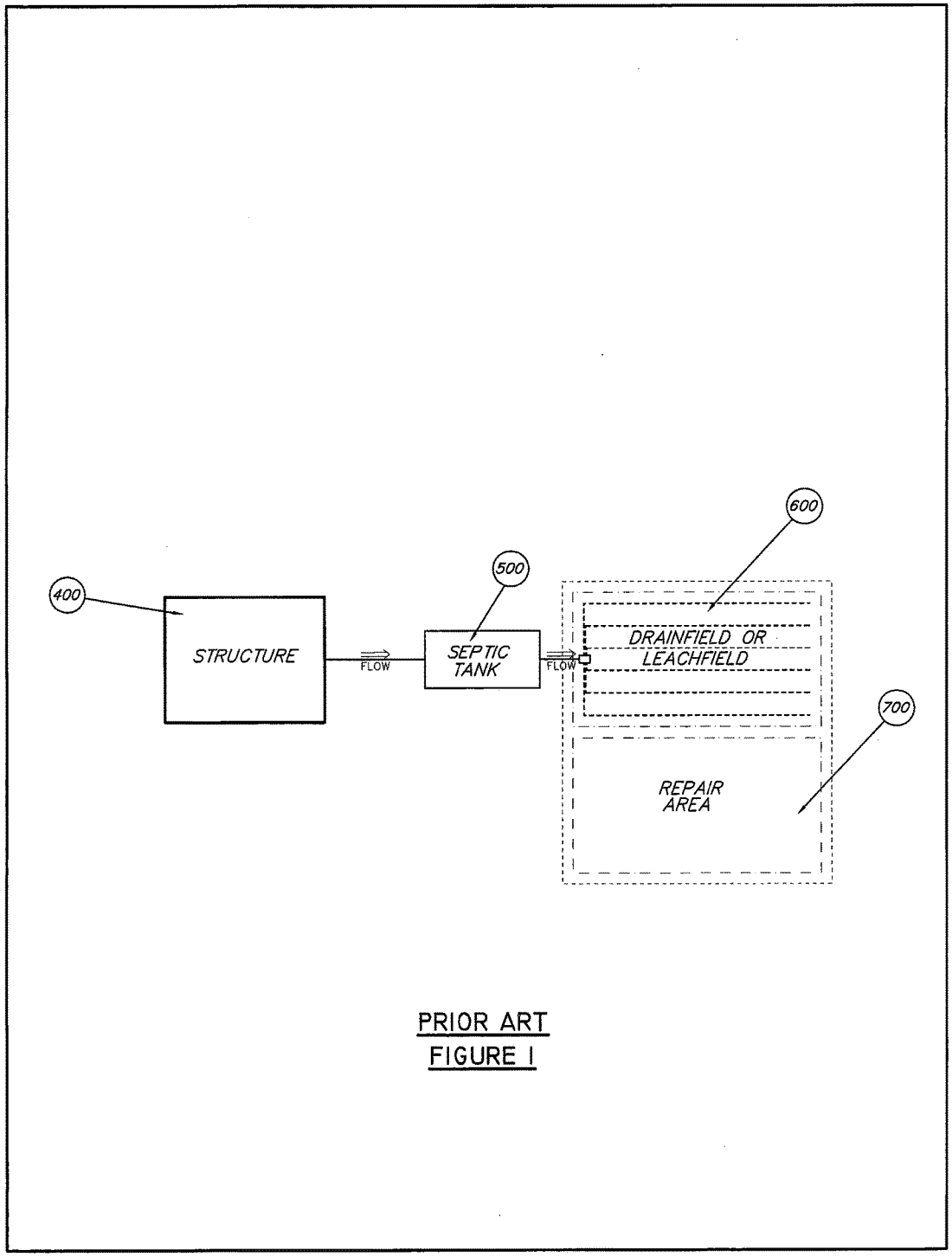
FIG. 1 shows a prior art septic wastewater system.

The present invention will now be described in more detail with reference to the accompanying drawings, in which preferred embodiments of the invention are shown. In the drawings, the relative sizes of regions or features may be exaggerated for clarity. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under," "below," "lower" "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a system or method comprises components or steps A, B and C, it is specifically intended that any of A, B or C, or a combination thereof, can be omitted and disclaimed singularly or in any combination.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used in the description of the invention and the appended claims, the singular forms "a," "an," and "the" are, intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as distance or volume, is meant to encompass variations of ±20%, ±10%, ±5%, ±1%, ±0.5%, or even ±0.1% of the specified amount.

The transitional phrase "consisting essentially of" means that the scope of a claim is to be interpreted, to encompass the specified materials or steps recited in the claim, "and those that do not materially affect the basic and novel characteristic(s)" of the claimed invention. See, In re Herz, 537 F.2d 549, 551-52, 190 USPQ 461, 463 (CCPA 1976) (emphasis in the original); see also MPEP § 2111.03.

The term "wastewater" or "sewage," as used herein, refers to water that has been used for bathing, toilets, cooking, dishwashing, clothes washing, etc., or industrial processes that is discharged from residences, commercial buildings, and other structures.

The term "treated wastewater," as used herein, refers to wastewater that has been treated in a manner such that it can be safely used for non-potable purposes, such as irrigation.

The present invention relates to a system and method for wastewater treatment and decentralized disposal of the treated wastewater. The present invention further provides a system and method for converting existing septic wastewater systems to a wastewater treatment plant system, e.g., a wastewater treatment plant disposal system that combines the advantages of a wastewater treatment plant with the advantages of decentralized disposal of the treated wastewater. The present invention provides a system in which the disposal of treated wastewater includes both surface disposal (e.g., irrigation) and sub-surface disposal (e.g., more than 6 inches below the surface, such as a drainfield). The system thereby avoids typical municipal restrictions on surface disposal. The present invention advantageously avoids the need for a large centralized area for disposal of treated wastewater, preserves open green space, reduces potable water consumption (thereby reducing costs), takes advantage of existing disposal systems, avoids the negative aspects of septic systems (including health risks associated with contaminated standing surface water, the concern of septic backup in structures, the expense of maintenance pumping and regular treatment of septic tanks), and reduces concern about the rise of the water table due to rising sea levels.

Thus, one aspect of the invention relates to wastewater treatment system comprising:
a wastewater source;
an outlet line fluidly connecting the wastewater source to a wastewater treatment plant;
an inlet line fluidly connecting the wastewater treatment plant to a holding tank for treated wastewater, wherein the holding tank is located at or adjacent to, the wastewater source; and
a distribution line fluidly connecting the holding tank to a treated wastewater use recipient.

In another aspect, the present invention relates to a method for treating wastewater, the method comprising:
transporting wastewater from a wastewater source through an outlet line to a wastewater treatment plant;
treating the wastewater at the wastewater treatment plant to produce treated wastewater;
transporting the treated wastewater through an inlet line to a holding tank for treated wastewater, wherein the holding tank is located at or adjacent to the wastewater source; and
distributing the treated wastewater through a distribution line to a treated wastewater use recipient.

In a further aspect, the present invention relates to a method for converting an existing septic wastewater system to a wastewater treatment plant system, the method comprising:
converting a septic tank to a treated wastewater holding tank;
fluidly connecting an outlet line from a wastewater source to a wastewater treatment plant;
fluidly connecting an inlet line from the wastewater treatment plant to the treated wastewater holding tank, wherein the holding tank is located at or adjacent to the wastewater source; and
fluidly connecting a distribution line from the holding tank to a treated wastewater use recipient.

FIG. 1 illustrates a prior art septic tank system in which a wastewater source is connected to a septic tank which is connected to a drain field or leachfield.

Figure 2:
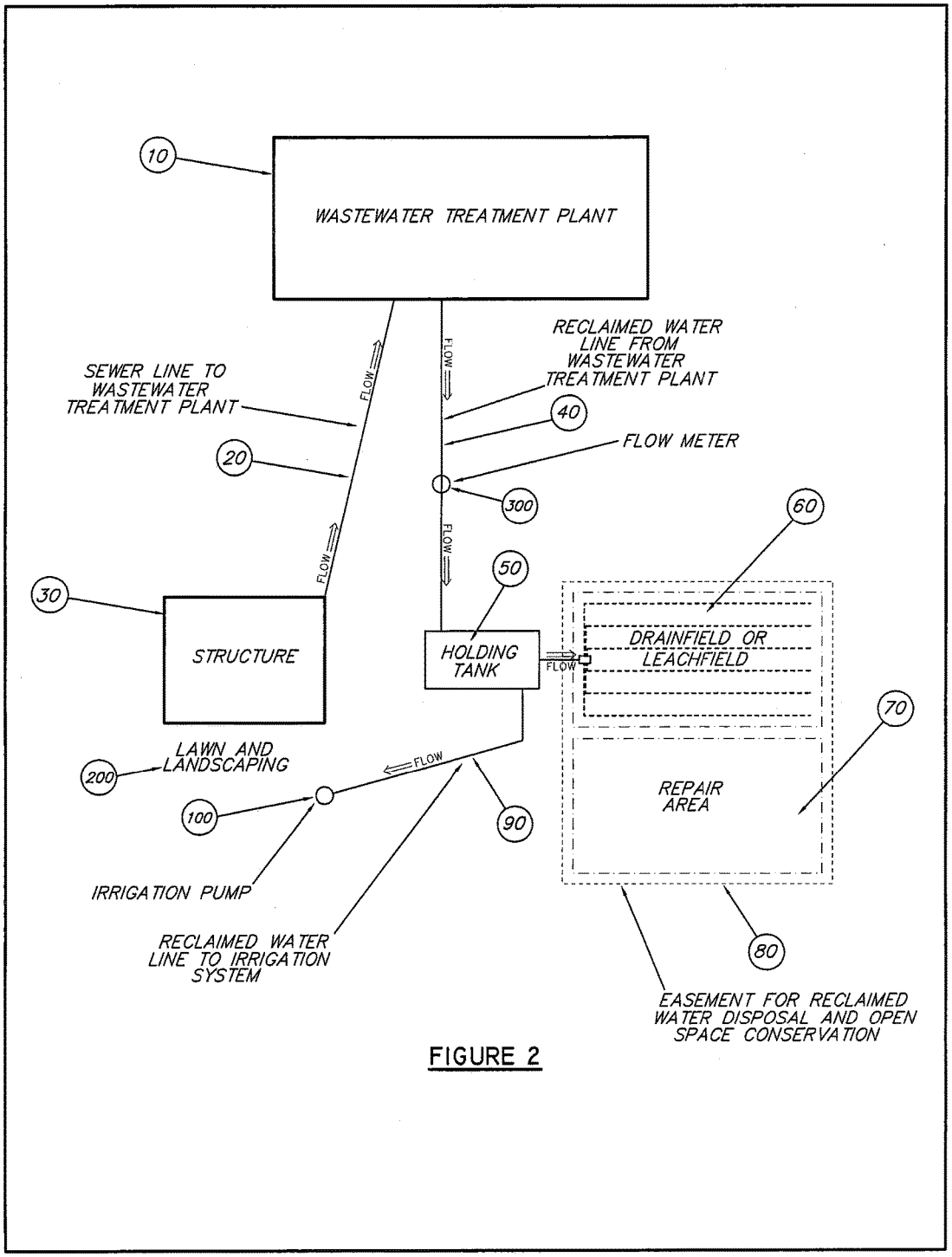
FIG. 2 shows a wastewater treatment system of the invention.

The system and methods of the present invention are illustrated in FIG. 2. The wastewater source may be any structure 30 that produces wastewater. Examples include, without limitation, residences, commercial buildings, government buildings, schools, churches, hotels, and the like. The system may include multiple wastewater sources all directly or indirectly connected to the wastewater treatment, plant, e.g., 2, 5, 10, 25, 50, 100, 500, 1000, or more wastewater sources. In some embodiments, most or all of the wastewater structures within a certain distance of a wastewater treatment plant are connected to the plant, e.g., most or all of the wastewater structures within 1, 5, 10, 15, 20, 25, or more miles of the plant. In some embodiments, the wastewater source may be the structure that generates the wastewater. In other embodiments, the wastewater source may be adjacent to the structure that generates the wastewater (e.g., on the same property) and stores the wastewater generated by the structure (e.g., a septic tank or storage tank).

The wastewater treatment plant 10 may be any type of plant suitable for treating wastewater known in the art. The plants may carry out wastewater pretreatment, primary treatment, secondary treatment, and/or tertiary treatment, and may include one or more processes and mechanisms for sedimentation, filtration, lagooning, removal of nutrients, nitrogen, and/or phosphorus, disinfection, and odor control.

Wastewater generated at the structure 30 is transported through the outlet line 20 to the wastewater treatment plant 10. The outlet line 20 may be connected directly to the structure 30 or, indirectly through a septic tank or storage tank that collects the wastewater from the structure 30. In certain embodiments, the solids in the wastewater are separated in the septic tank or storage tank and only the liquid wastewater is transported to the wastewater treatment plant. At the plant the wastewater is treated using techniques known in the art to produce treated wastewater reclaimed water). The treated wastewater is then transported through inlet line 40 to a holding tank for treated wastewater 50 which is located at or adjacent to the wastewater source. The holding tank 50 may be, in, under, or on the structure that is the wastewater source or may be adjacent to the wastewater source, e.g., on the same property as the wastewater source. In certain embodiments, the holding tank 50 may be located within about 10, 20, 30, 40, 50, 60, 70, 80, 90, or 100 yards of the structure 30. In some embodiments, a holding tank 50 may not be provided for every wastewater source. Instead, a single holding tank 50 may be provided for use with multiple wastewater sources, e.g., 2, 3, 4, 5, 6, 7, 8, 9, or 10 or more wastewater sources.

In some embodiments, the treated wastewater transported to the holding tank 50 may be produced from the same wastewater transported from the structure 30 to the wastewater treatment plant 10. In other embodiments, treated wastewater transported to the holding tank 50 may be produced from wastewater from multiple structures mixed together at or on the way to the wastewater treatment plant 10. The amount of treated wastewater transported to the holding tank 50 may be the same as, more, or less than the amount of wastewater transported to the wastewater treatment plant 10 from structure 30.

The treated wastewater in the holding tank 50 is distributed through one or more distribution lines 90 to one or more treated wastewater use recipients. In some embodiments, the treated wastewater in the holding tank 50 is distributed through the distribution line 90 to an irrigation system, e.g., through an irrigation pump 100 so that the treated wastewater is used to irrigate a lawn and/or landscaping 200 at or adjacent to the structure 30, e.g., using sprinklers, drip hoses, or other irrigation devices. In other embodiments, the treated wastewater in the holding tank 50 is transported to the structure for non-potable uses, such as operating toilets. In other embodiments, the treated wastewater in the holding tank 50 is used for other activities at or adjacent to the structure 30, such as car washing, power washing the structure 30 or other items, and filling fountains or other water features.

In certain embodiments, the treated wastewater in the holding tank 50 is transported to a drainfield or leachfield 60 located at or adjacent to the structure 30. The drainfield or leachfield 60 may be located next to or near a repair area 70. The repair area 70 is typically of a similar size to the drainfield or leachfield 60 and may be used to install a new drainfield or leachfield as needed. In some embodiments, the drainfield or leachfield 60 and the repair area 70 may be part of an easement 80, e.g., as part of open space conservation.

In some embodiments, the holding tank 50 comprises multiple distribution lines so that treated wastewater may be transported to multiple treated wastewater use recipients, either simultaneously or at different times. In certain embodiments, the treated wastewater in the holding tank 50 is distributed to various treated wastewater use recipients as needed and is transported to the drainfield or lead field 60 only when the treated wastewater amount in the holding tank 50 exceeds a specified amount. Such distribution may be controlled by, for example, a float switch assembly in the holding tank 50.

The outlet line 20, the inlet line 40, and the distribution line 90 may be any type of fluid flow path and includes one or more of pipes, tubes, adapters, fittings, pumps, and valves. Transport of wastewater and treated wastewater though the lines may be carried by any method known in the art, and may include one or more of pressurized force, vacuum force, and gravity. The outlet line 20, the inlet line 40, and the distribution line 90 may be configured to control flow rate and/or direction of the wastewater and/or treated wastewater, e.g., through the use of valves, pumps, and controllers.

The outlet line 20, the inlet line 40, and/or the distribution line 90 may comprise one or more flow meters 300 to measure the amount of wastewater or treated wastewater passing through the lines.

The holding tank 50 may be made of concrete, plastic, or any other suitable material, and, may be of any suitable size sufficient to hold treated wastewater, e.g., about 500, 1000, 2000, 5000, or 10000 gallons or more.

In some embodiments, the holding tank 50 may further be fitted with lines to receive, hold, and distribute water in addition to treated wastewater. Examples include, without limitation, storm water, e.g., collected from gutters or rain barrels on the structure 30, swimming pools, fountains, and other water features.

In some embodiments, the wastewater treatment system may be one that is newly built, e.g., at the same time as wastewater sources are built. In other embodiments, the wastewater treatment system is built by converting a pre-existing wastewater system, such as a septic sewer system, to the system of the present invention. The conversion may be carried out by replacing an existing septic tank with a treated wastewater holding tank 50 or retrofitting an existing septic tank to convert it to a treated wastewater holding tank 50. The system is then established by connecting an outlet line 20 from the wastewater source 30 to a wastewater treatment plant 10, connecting an inlet line 40 from the wastewater treatment plant 10 to the holding tank 50, and connecting a distribution line 90 from the holding tank to one or more treated wastewater use recipients.

It will be understood by those of skill in the art that numerous and various modifications can be made without departing from the spirit of the present invention. Therefore, it should be clearly understood that the forms of the present invention are illustrative only and are not intended to limit the scope of the present invention.

All publications, patent applications, patents, patent publications, and other references cited herein are incorporated by reference in their entireties for the teachings relevant to the sentence and/or paragraph in which the reference is presented.

The foregoing is illustrative of the present invention, and is not to be construed as limiting thereof. The invention is defined by the following claims, with equivalents of the claims to be included therein.

What is claimed is:

1. A method for converting an existing septic wastewater system to a wastewater treatment plant system, the method comprising:
   converting a septic tank to a treated wastewater holding tank;
   fluidly connecting an outlet line from a wastewater source to a wastewater treatment plant;
   fluidly connecting a treated water line from the wastewater treatment plant to an inlet line of the treated wastewater holding tank, wherein the holding tank is located at or adjacent to the wastewater source; and
   fluidly connecting a distribution line from the holding tank to a treated wastewater use recipient.

2. The method of claim 1, wherein the wastewater source is at or adjacent to a residence, commercial building, or school.

3. The method of claim 1, wherein multiple wastewater sources are fluidly connected to the wastewater treatment plant.

4. The method of claim 1, wherein the wastewater use recipient is an irrigation system.

5. The method of claim 1, wherein the wastewater use recipient is a toilet.

6. The method of claim 1, wherein the wastewater use recipient is a drainfield or leachfield.

7. The method of claim 6, wherein the drainfield or leachfield further comprises a repair area.

8. The method of claim 1, wherein transport through the outlet line and/or the inlet line and/or the distribution line is controlled by pressurized force, gravity, and/or vacuum.

9. The method of claim 1, wherein the outlet line and/or the inlet line and/or the distribution line comprises one or more pumps configured to transport the wastewater and/or treated wastewater.

10. The method of claim 1, wherein the outlet line and/or the inlet line and/or the distribution line comprises one or more valves configured to control the flow rate and/or direction of the wastewater and/or treated wastewater.

11. The method of claim 1, wherein the outlet line and/or the inlet line and/or the distribution line comprises one or more flow meters configured to measure the amount of wastewater and/or treated wastewater being transported.

12. The method of claim 1, wherein the holding tank is fluidly connected to more than one distribution line, and wherein at least one distribution line is fluidly connected to a drainfield or leachfield.

* * * * *